United States Patent Office 3,411,876
Patented Nov. 19, 1968

3,411,876
PREPARATION OF HYDRARGILLITE
Max Michel, Sarcelles-les-Rosiers, and Denis Papée,
Paris, France, assignors to Produits Chimiques
Pechiney-Saint-Gobain, Neuilly-sur-Seine, France
No Drawing. Filed May 25, 1964, Ser. No. 370,035
Claims priority, application France, May 27, 1963,
936,111
6 Claims. (Cl. 23—143)

ABSTRACT OF THE DISCLOSURE

The preparation of hydrargillite in fine crystalline form by aging a suspension of aluminum hydroxide having up to 35% by weight alumina calculated as $Al_2O_3$ and at least 10% monovalent acid ions based upon the molecules of $Al_2O_3$ in which the aging step to develop the suspension is carried out under nondrying conditions and thereafter bringing the suspension into a medium in the form of an ammoniacal or amino medium to transform the alumina into a hydrargillite base crystalline substance.

---

This invention relates to an aluminum trihydrate of the hydrargillite variety of high chemical purity, in the form of clear, fine and regular crystals. The hydrargillite [$Al(OH)_3$] is defined as a native aluminum hydroxide having the crystal form of colorless needles.

It is well known that aluminum metallurgy requires the use of aluminum hydrate and methods for its recovery are available. Thus, this hydrate is available industrially in the form of crystal agglomerates in the crystallographic variety which is called hydrargillite; however, the structural qualities of this alumina are only of a secondary interest.

It is also recognized that the crystalline form of the elementary hydrargillite crystals, that is, crystals in the form of thin sheets, has many uses. For example, this alumina variety is used as a filming agent and as a charge and pigment. Such applications are possible, however, only if the crystalline structure is well defined. Thus, it is necessary for the elementary crystals to be of rather uniform dimensions and easily dispersable, and high chemical purity of the product is also usually required.

One proposed method for obtaining clear and regular hydrargillite crystals involves the development of an alumina gel in contact with a solution of an alkaline metal salt. This leads to the formation of a complex mixture of hydrates which contains very fine hydrargillite crystals. The mixture is subsequently primed to provide for precipitation of the sodium aluminate by this mixture. In this manner very clear crystals of hydrargillite are obtained, but they are of rather large dimensions and retain considerable amounts of sodium.

It is one object of this invention to provide elementary hydrargillite crystals which are characterized by an extremely well defined crystalline structure whereby the crystals can be employed for a variety of specific applications.

It is an additional object of this invention to provide hydrargillite crystals characterized by a well defined crystalline structure which includes elementary crystals of uniform dimensions and of high chemical purity, and which is adapted to be easily dispersed in water.

These and other objects of this invention will appear hereinafter and it will be understood that the specific examples hereafter set forth are provided for purposes of illustration and not by way of limitation.

The instant invention which overcomes the disadvantages of the prior art, relates to a method for producing substances comprising pure hydrargillite, that is, hydrargillite in the form of clear, fine and regular crystals which are highly dispersible in water. The method consists in precipitating aluminum hydroxide or a cake of this hydroxide containing up to 35 percent by weight of alumina (calculated as $Al_2O_3$), and, in relation to this alumina (counted in molecules of $Al_2O_3$) a proportion of monovalent acid ions at least equal to 0.10. The method also consists in letting this suspension or cake build up without any dessication to a temperature between the ambient temperature and 60° C. during at least two days, and to bring this suspension or cake in ammoniacal or amino medium to a temperature between ambient temperature and 120° C. during such a time whereby substantially all of the alumina is transformed into a crystalline substance of the basis of hydrargillite.

This invention is also directed to the pure hydrargillite in clear, fine and regular crystals which is produced by the novel methods and which possesses the desired properties, and the invention is also directed to substances produced on the basis of this hydrargillite.

The development of freshly precipitated alumina gel in ammonia medium is known but these known techniques only lead to the more or less rapid formation of a mixture of crystallographic varieties called bayerite and norstrandite. These varieties are poorly crystallized or pseudoamorphous trihydrates and such a mixture, very different from a lamellar body of regular structure, is of little interest to the art.

It has been discovered that if an alumina gel is put into ammoniacal or amino suspension and is subjected to a preliminary buildup in accordance with this invention, a hydrargillite structure is produced which comprises crystallographically and chemically pure hydrargillite instead of bayerite and norstrandite. The finess of the crystals obtained is greater than that of the crystals manufactured according to the methods of prior art. Their maximum dimensions in the plane, directly measured according to photographs on the electronic microscope actually range from 200 to 1000 A. and, from measurements of their specific surfaces, their thickness can be deduced and has been found to vary form 100 to 200 A.

The instant invention may involve a method for obtaining sheet-like substances, whose crystallization of hydrargillite structure is extremely fine and nonuniform. This method comprises the development of an alumina gel containing more than .10 monovalent acid ion in relation to the alumina calculated on the number of $Al_2O_3$ molecules. When this structure is obtained, as proved by tests with the aid of X-ray diffractions, a further development in ammoniacal or amino medium of these crystalline substances in accordance with this invention, leads to quite clear hydrargillite crystals. Methods for the preparation of substances adapted to be subjected to the procedure of this invention are described in French patent application No. 934,790 entitled "Ultra-Fine, Hydrargillite Highly Dispersible in Water and Practically Free From Foreign Cations."

It is difficult to detect under X-rays a clearly crystallized structure in jellies subjected to a less severe development. It has been discovered, however, that the second buildup of such jellies in ammoniacal or amino medium, after a first development of short duration, likewise leads to hydrargillite in clear crystals which are quite regular, and which likewise are the subject of this invention. In extreme cases, however, this hydrargillite is mixed in small amounts with other aluminum hydroxides, such as bayerite and norstrandite, which do not interfere with the use for which it is intended.

The applicant also discovered that the buildup of other suspensions under not drying conditions at a temperature ranging from ambient to 60° C., which suspensions are much richer in water than the gels mentioned in the previously cited application, and which contain at least .10 monovalent acid ion in relation to the alumina calculated as $Al_2O_3$ molecules, leads to mixtures of hydroxides where the ultra-fine hydrargillite is present. A second development in ammoniacal or amino medium of such suspensions also leads to substances constituted almost exclusively from hydrargillite in fine clear and regular crystals.

In both the first development of the alumina and in the second development in ammoniacal or amino medium, the temperature plays the part of an accelerator. In both the first and second development it is preferable to use moderate temperatures, below 60° C. in the first development, and below 120° C. in the second one, in order to avoid the formation of excessive quantities of other crystalline forms blended with the hydrargillite.

This invention also relates to the formation of substances on a hydrargillite base, which are obtained according to this method. These substances find uses as film-forming products, as pigments, as charge, as precursors of an adsorbent of high specific surface, which is obtained by moderately calcinating these substances on a hydrargillite basis, and as precursors of alpha alumina of great fineness, which is obtained by calcination of these substances at a higher temperature. Such alpha alumina can be used in ceramics, for instance.

Operations of crystallization are known to be hard to reproduce, both with regard to the uniqueness of the crystallographic species, and with reference to the aspects and physical properies of the crystals obtained. Moreover, the examples given below are furnished merely for indication, in order to illustrate the invention, but it will be understood that changes in detail may be made in the methods described below without deviating from the spirit of the invention.

EXAMPLE 1

A suspension of alumina gel titrating 50 grams/liter of alumina calculated as $Al_2O_3$ is obtained by adding continuously in a container and under vigorous agitation a solution of sodium aluminate containing 100 grams/liter of alumina calculated as $Al_2O_3$, the ratio of $Na_2O:Al_2O_3$ being 1.5. The sodium aluminate is added to a solution of nitric acid of suitable concentration and in such proportions that the pH only fluctuates between 8 and 9 units during the entire duration of the precipitation. This suspension is homogenized by agitation during approximately one hour and is dried, then washed over a filter with at least 50 liters of water per kilogram of alumina. The cake obtained contains about 17 percent alumina by weight calculated as $Al_2O_3$, 200 p.p.m. of $Na^+$ ions and a quantity of $NO_3^-$ acid ions of .21 in relation to the alumina calculated as $Al_2O_3$ molecules. This cake is allowed to develop for 20 days at room temperature, and it is then placed in suspension in an ammonia solution titrating 2 N in $NH_3OH$, in such a manner that this suspension contains 10 percent alumina by weight counted in $Al_2O_3$. This suspension is kept for 20 days at ambient temperature, and the product is then dried, washed in ammoniacal water of pH 8, dried again and dried with care at 110° C. Submicronic hydrargillite is obtained in clear and regular crystals, which is highly dispersible in water and has a specific surface in the order of 70 m.² per gram. This hydrargillite is particularly free from other crystalline species.

EXAMPLE 2

The same gel as is obtained in Example 1 is provided in the same way as described in this example. The second development takes place in the same ammonia medium as in Example 1 and with the same concentrations, but at a temperature of 90° C. for a period of two days. After ammoniacal washing and drying as described in Example 1, a crystallographically pure hydrargillite of the same general features as the one of Example 1 is obtained, the product having a specific surface of 60 m.² per gram.

EXAMPLE 3

The same alumina gel as the one of the preceding examples is allowed to buildup for a period of 12 days at ambient temperature, then for two days in ammonia medium at a temperature of 90° C., in the manner of Example 2. After ammoniacal washing and drying a hydrargillite of 55 m.²/gram of specific surface is obtained but considerable amounts of other crystallographic species (bayerite and norstrandite) are mixed in. This example illustrates that a first shorter buildup at ambient temperature suffices to assure a very high proportion of hydrargillite in the final product.

EXAMPLE 4

The same alumina gel as in the preceding examples is allowed to buildup for four days at 40° C., then two days at 90° C. in ammonia medium, as indicated in the above Examples 2 and 3. After ammoniacal washing and careful drying hydrargillite crystals with a specific surface of 45 m.²/gram are obtained which contain some traces of other hydroxides.

EXAMPLE 5

The precipitation of the gel is carried out under the same conditions as in the preceding examples, but an aqueous suspension of this jelly, containing 100 grams of alumina (calculated as $Al_2O_3$) per liter is allowed to buildup during 20 days at ambient temperature. The second buildup is accomplished in ammonia medium with the same concentrations in alumina and ammonia, as indicated in the above examples for one day at 90° C. After ammoniacal washing and drying a hydrargillite is obtained which is practically free from other hydroxides and whose specific surface is 58 m.²/grams.

EXAMPLE 6

There is provided an alumina gel cake substantially corresponding to the one used in the preceding example, but containing, with reference to the alumina (calculated as $Al_2O_3$ molecules) a quantity of $NO_3^-$ ions equal to .27. This cake is allowed to build up for four days at a temperature of 60° C., then, as described in the preceding examples, a buildup is carried out in ammonia medium for two days at 90° C. After ammoniacal washing and drying a hydrargillite is obtained which has a specific surface of 50 m.²/gram and which contains only a few foreign hydroxides.

EXAMPLE 7

The alumina gel of the preceding examples was subjected to the treatment set forth in Example 4. In this case, an amino medium comprising butyl amine was employed. Hydrargillite crystals with a specific surface of about 50 m.²/gram are obtained with this procedure.

EXAMPLE 8

A procedure corresponding to that set forth in Example 7 was undertaken utilizing triethylamine as the amino medium. Similar results regarding the characteristics of the hydrargillite crystals were detected.

It is self-evident that in certain cases, where the same substances on a hydrargillite base are intended to be used rapidly in an aqueous dispersion, it is advantageous to eliminate the phase of careful drying and to dilute these substances in the appropriate quantity of aqueous medium.

It will be understood that various changes and modifications may be made in the above described process which provide the characteristics of this invention without departing from the spirit thereof particularly as defined in the following claims.

That which is claimed is:

1. A method for preparing hydrargillite crystals comprising the steps of forming a suspension of aluminum hydroxide containing up to 35 percent by weight alumina, calculated as $Al_2O_3$, and comprising at least 10 percent monovalent acid ions based on the calculated molecules of $Al_2O_3$, developing the suspension by aging to nondrying conditions by holding the suspension at a temperature between room temperature and 60° C. for a period of time, and thereafter bringing the suspension into a medium selected from the group consisting of an organic amine and a solution of ammonia to transform the alumina into a hydrargillite based crystalline substance wherein such suspension is held in such medium at a temperature between ambient temperature and 120° C.

2. A method in accordance with claim 1 wherein said medium comprises an ammonia solution titrating 2 N in $NH_4OH$.

3. A method in accordance with claim 1 wherein said medium comprises a member selected from the group consisting of butylamine and triethylamine.

4. The method as claimed in claim 1 in which the suspension is aged for a period of at least two days.

5. A method for preparing hydrargillite crystals comprising the steps of preparing a suspension of aluminum hydroxide containing up to 35 percent by weight alumina, calculated at $Al_2O_3$, and at least 10 percent monovalent acid ion based upon the amount of alumina by precipitating aluminum hydroxide for a solution containing aluminum ions with a monovalent acid in amounts to maintain the pH within the range of 8 to 9, developing the suspension by holding the suspension under nondrying conditions at a temperature between room temperature and 60° C. for a period of time, and introducing the suspension into a medium selected from the group consisting of an organic amine and a solution of ammonia at a temperature between ambient temperature and 120° C. to complete transformation of the aluminum hydroxide to a hydrargillite based crystalline structure.

6. A method for preparing hydrargillite crystals comprising the steps of preparing a suspension of aluminum hydroxide containing up to 35% by weight alumina, calculated as $Al_2O_3$, and at least 10% monovalent acid ion based upon the amount of alumina by precipitating aluminum hydroxide from a solution containing aluminum ions with a monovalent acid in amounts to maintain the pH within the range of 8 to 9, developing the suspension by aging under nondrying conditions and introducing the suspension into a medium selected from the group consisting of ammoniacal and amino medium to complete transformation of the aluminum hydroxide to a hydrargillite base crystalline structure.

References Cited

UNITED STATES PATENTS

| | | | |
|---|---|---|---|
| 2,247,624 | 7/1941 | Wall | 23—143 |
| 2,973,245 | 2/1961 | Teter et al. | 23—143 |
| 3,086,845 | 4/1963 | Malley et al. | 23—143 |
| 3,124,418 | 3/1964 | Malley et al. | 23—143 |

OTHER REFERENCES

Russell: "Alumina Properties," Technical Paper No. 10, Aluminum Co. of America, Pittsburgh, Pa., 1953, pages 25 and 26.

EARL C. THOMAS, *Primary Examiner.*

HERBERT T. CARTER, *Assistant Examiner.*